(12) United States Patent
Miyaoka

(10) Patent No.: US 8,688,035 B2
(45) Date of Patent: Apr. 1, 2014

(54) RADIO COMMUNICATION SYSTEM

(75) Inventor: Hirosada Miyaoka, Chiba (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 13/429,744

(22) Filed: Mar. 26, 2012

(65) Prior Publication Data

US 2012/0252358 A1 Oct. 4, 2012

(30) Foreign Application Priority Data

Mar. 31, 2011 (JP) ................................. 2011-080119

(51) Int. Cl.
*H04B 7/24* (2006.01)

(52) U.S. Cl.
USPC .............. 455/39; 455/562; 375/260; 343/742

(58) Field of Classification Search
USPC ........................................................... 455/39
See application file for complete search history.

(56) References Cited

U.S. PATENT DOCUMENTS

| | | | | |
|---|---|---|---|---|
| 5,672,834 A | * | 9/1997 | Searle et al. | 73/862.338 |
| 5,701,583 A | * | 12/1997 | Harbin et al. | 455/25 |
| 6,006,069 A | * | 12/1999 | Langston | 455/62 |
| 6,150,984 A | * | 11/2000 | Suguro et al. | 343/702 |
| 6,212,413 B1 | * | 4/2001 | Kiesi | 455/575.7 |
| 6,216,244 B1 | * | 4/2001 | Myers et al. | 714/746 |
| 6,229,486 B1 | * | 5/2001 | Krile | 343/700 MS |
| 6,360,107 B1 | * | 3/2002 | Lin et al. | 455/562.1 |
| 6,518,932 B1 | * | 2/2003 | Matsui et al. | 343/770 |
| 6,545,632 B1 | * | 4/2003 | Lyons et al. | 342/45 |
| 6,553,239 B1 | * | 4/2003 | Langston | 455/562.1 |
| 6,768,821 B2 | * | 7/2004 | Silverbrook et al. | 382/313 |
| 6,797,895 B2 | * | 9/2004 | Lapstun et al. | 178/19.05 |
| 6,862,433 B2 | * | 3/2005 | Callaway, Jr. | 455/101 |
| 7,110,720 B1 | * | 9/2006 | Henderson | 455/66.1 |
| 7,215,220 B1 | * | 5/2007 | Jia | 333/125 |
| 7,272,367 B2 | * | 9/2007 | Amano | 455/114.2 |
| 7,398,049 B2 | * | 7/2008 | Blodgett et al. | 455/3.01 |
| 7,409,226 B1 | * | 8/2008 | Stevenson | 455/562.1 |
| 7,497,759 B1 | * | 3/2009 | Davis | 446/454 |
| 7,804,443 B2 | * | 9/2010 | Nagaishi et al. | 342/70 |
| 7,837,153 B2 | * | 11/2010 | Chesser et al. | 244/158.2 |
| 7,948,381 B2 | * | 5/2011 | Lindsay et al. | 340/572.3 |
| 8,022,891 B2 | * | 9/2011 | Leisten | 343/895 |
| 8,144,066 B2 | * | 3/2012 | Parsche | 343/742 |
| 8,401,393 B2 | * | 3/2013 | Davidson et al. | 398/124 |
| 8,415,577 B2 | * | 4/2013 | Garcia et al. | 200/564 |
| 8,565,334 B2 | * | 10/2013 | Ito | 375/267 |
| 2003/0023353 A1 | * | 1/2003 | Badarneh | 701/1 |
| 2004/0198401 A1 | * | 10/2004 | Rodgers et al. | 455/502 |
| 2007/0051524 A1 | * | 3/2007 | Mientkewitz et al. | 174/28 |
| 2008/0129408 A1 | * | 6/2008 | Nagaishi et al. | 333/33 |
| 2010/0214177 A1 | * | 8/2010 | Parsche | 343/702 |

(Continued)

FOREIGN PATENT DOCUMENTS

WO WO 2010/067838 A1 6/2010

*Primary Examiner* — Hai V Nguyen
(74) *Attorney, Agent, or Firm* — Oblon, Spivak, McClelland, Maier & Neustadt, L.L.P.

(57) ABSTRACT

A radio communication system includes: a first member; a second member; a transmitting apparatus provided on the first member; and a receiving apparatus provided on the second member, wherein the first member and the second member are provided such that they can move relative to each other; and radio communication is performed when the transmitting apparatus and the receiving apparatus face each other as the first member and the second member move relative to each other.

12 Claims, 13 Drawing Sheets

(56) References Cited

U.S. PATENT DOCUMENTS

| | | | |
|---|---|---|---|
| 2010/0295699 A1* | 11/2010 | Rushing | 340/825.49 |
| 2011/0075747 A1* | 3/2011 | Mihota | 375/260 |
| 2011/0076944 A1* | 3/2011 | Mihota | 455/41.2 |
| 2011/0178756 A1* | 7/2011 | Anderson | 702/104 |
| 2011/0218398 A1* | 9/2011 | Tamura et al. | 600/109 |
| 2012/0021790 A1* | 1/2012 | Kister et al. | 455/507 |
| 2012/0093041 A1* | 4/2012 | Takeda et al. | 370/280 |
| 2012/0220239 A1* | 8/2012 | Hosoya et al. | 455/63.4 |
| 2013/0059553 A1* | 3/2013 | Orihashi et al. | 455/126 |
| 2013/0082889 A1* | 4/2013 | Le Bars et al. | 343/753 |

* cited by examiner

RADIO COMMUNICATION SYSTEM

FIELD

The present disclosure relates to a radio communication system and, more particularly, to a radio communication system which allows reliable radio communication.

BACKGROUND

Some communication apparatus according to the related art are controlled to perform predetermined operations in a state in which they are disposed on a rotary body (for example, see International Patent Publication No. 2010/067838 (Patent Document 1)).

When radio communication with a communication apparatus disposed on a rotary body is performed using the millimeter waveband, electric waves are transmitted using structures such as a column provided in the middle of the rotary body, e.g., using the interior of the column as a waveguide.

SUMMARY

When electric waves having the same frequency are transmitted through a narrow space such as the interior of a column, interference can occur. However, it is difficult to perform multi-channel communication or bi-directional communication using a narrow space such as the interior of a column because of difficulty in providing a coupling structure to be used for multi-channel communication utilizing different frequencies in such a space.

Thus, it is desirable to provide the technique which allows radio communication to be reliably performed by a communication apparatus disposed on a movable structure such as a rotary body.

An embodiment of the present disclosure is directed to a radio communication system including a first member, a second member, a transmitting apparatus provided on the first member, and a receiving apparatus provided on the second member. The first member and the second member are provided such that they can move relative to each other. Radio communication is performed when the transmitting apparatus and the receiving apparatus face each other as the first member and the second member move relative to each other.

The transmitting apparatus or receiving apparatus may be an independent apparatus, and it may alternatively constitute an internal block forming a part of one apparatus.

The first member and the second member may be provided on the same axis of rotation and either or both of the first member and the second member may be rotated about the axis of rotation.

The first member and the second member may be formed integrally with each other, and the transmitting apparatus and the receiving apparatus may be provided on the first member and the second member respectively such that they can be normally made to face each other.

The first member and the second member may be formed separately from each other, and the transmitting apparatus and the receiving apparatus may be provided on the first member and the second member respectively such that they can be made to face each other as a result of rotation of the member(s).

Either or both of the first member and the second member may be slid.

Radio communication may be performed by a pair of transmitting and receiving apparatus facing each other using the same channel as used by another pair of transmitting and receiving apparatus.

Radio communication may be performed by a pair of transmitting and receiving apparatus facing each other using a channel different from a channel used by another pair of transmitting and receiving apparatus.

The radio communication system may further include a control apparatus controlling radio communication between the transmitting apparatus and the receiving apparatus.

The control apparatus may be an independent apparatus, and it may alternatively constitute an internal block forming a part of one apparatus.

The control apparatus may enable radio communication between a particular transmitting apparatus and a particular receiving apparatus based on terminal information for identifying the transmitting apparatus and the receiving apparatus.

The control apparatus may enable radio communication between a particular transmitting apparatus and a particular receiving apparatus based on position information indicating the positions to which the first member and the second member have been moved.

The transmitting apparatus and the receiving apparatus may be disposed on the first member and the second member in a one-to-many relationship.

The radio communication may utilize the millimeter waveband.

In the radio communication system according to the embodiment of the present disclosure, the first member and the second member are provided such that they can move relative to each other and radio communication is performed when the transmitting apparatus provided on the first member and the receiving apparatus provided on the second member face each other as a result of relative movement of the first member and the second member.

According to the embodiment of the present disclosure, radio communication can be reliably performed.

DETAILED DESCRIPTION

Embodiments of the present disclosure will now be described with reference to the drawings in the following order.

1. First Embodiment
2. Second Embodiment
3. Third Embodiment

First Embodiment

Configuration of Radio Communication System

Figure 1:
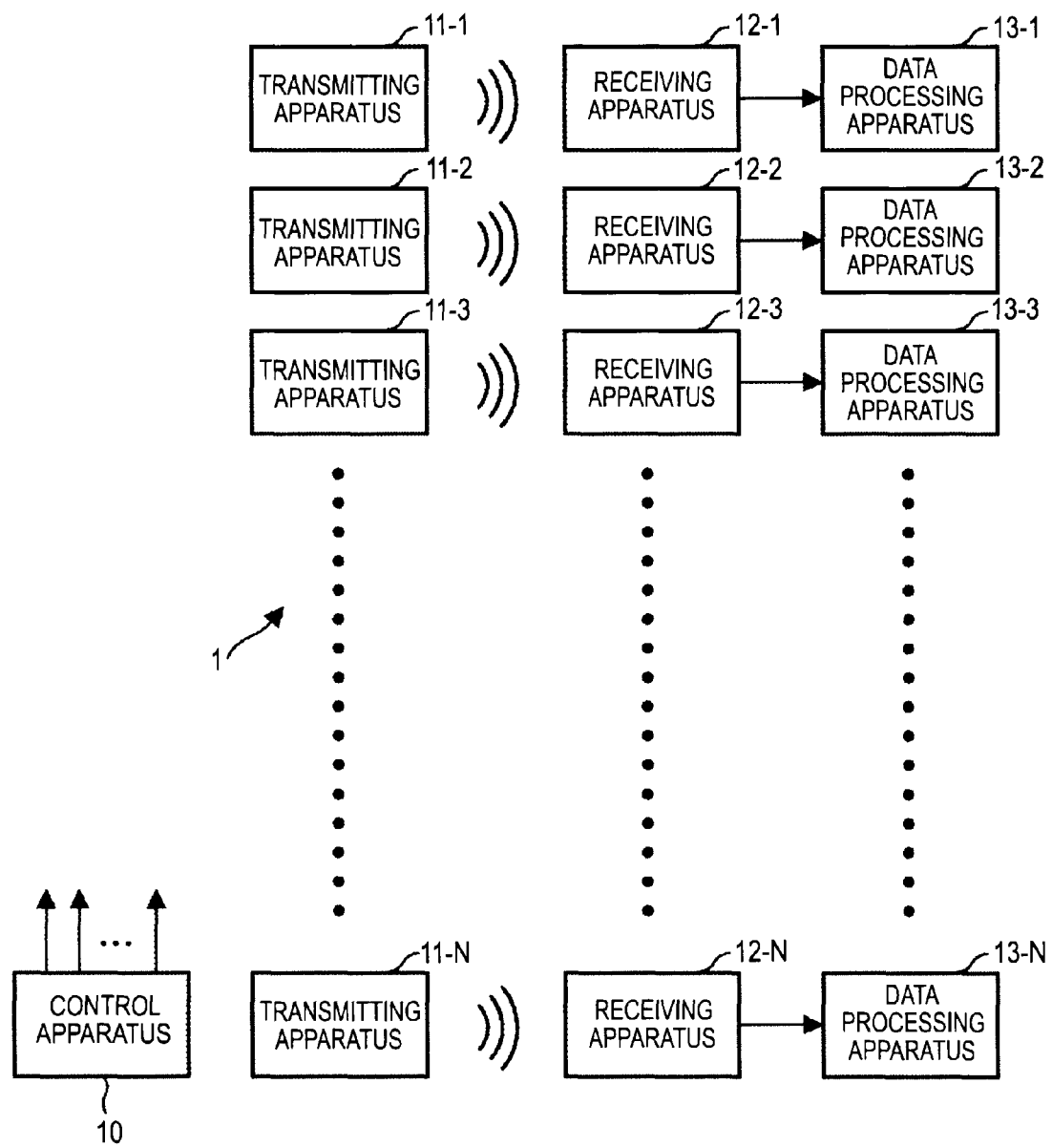
FIG. 1 is an illustration showing an exemplary configuration of a radio communication system.

FIG. 1 is an illustration showing an exemplary configuration of a radio communication system embodying the disclosed technique.

As shown in FIG. 1, a radio communication system 1 includes a control apparatus 10, transmitting apparatus 11-1 to 11-N, receiving apparatus 12-1 to 12-N, and data processing apparatus 13-1 to 13-N.

The control apparatus 10 controls radio communication performed between the transmitting apparatus 11-1 to 11-N and the receiving apparatus 12-1 to 12-N.

The transmitting apparatus 11-1 and the receiving apparatus 12-1 are communication apparatus which are paired with each other, and data is transmitted and received between the apparatus through radio communication utilizing, for example, the millimeter waveband.

Millimeter waves are electric waves having a frequency in the range from about 30 to 300 GHz or a wavelength in the range from about 1 to 10 mm. Because of high frequencies of electric waves in the millimeter waveband, data can be transmitted at a high data rate and radio communication can be performed using small antennas.

The receiving apparatus 12-1 supplies data received from the transmitting apparatus 11-1 to the data processing apparatus 13-1. The data processing apparatus 13-1 performs predetermined processes on the data supplied from the receiving apparatus 12-1 and outputs the resultant data.

Similarly, data is transmitted and received between the transmitting apparatus 11-2 to 11-N and the receiving apparatus 12-2 to 12-N through radio communication utilizing, for example, the millimeter waveband. The receiving apparatus 12-2 to 12-N supply data received from the transmitting apparatus 11-2 to 11-N to the data processing apparatus 13-2 to 13-N.

The data processing apparatus 13-2 to 13-N perform predetermined processes on the data supplied from the receiving apparatus 12-2 to 12-N and output the resultant data.

The radio communication system 1 is configured as described above.

In the following description, the transmitting apparatus 11-1 to 11-N may be referred to as "transmitting apparatus 11" when there is no need for distinguishing the transmitting apparatus from each other. The receiving apparatus 12-1 to 12-N may be referred to as "receiving apparatus 12" when there is no need for distinguishing the receiving apparatus from each other. The data processing apparatus 13-1 to 13-N may be referred to as "data processing apparatus 13" when there is no need for distinguishing the data processing apparatus from each other.

[Configuration of Transmitting Apparatus]

Figure 2:
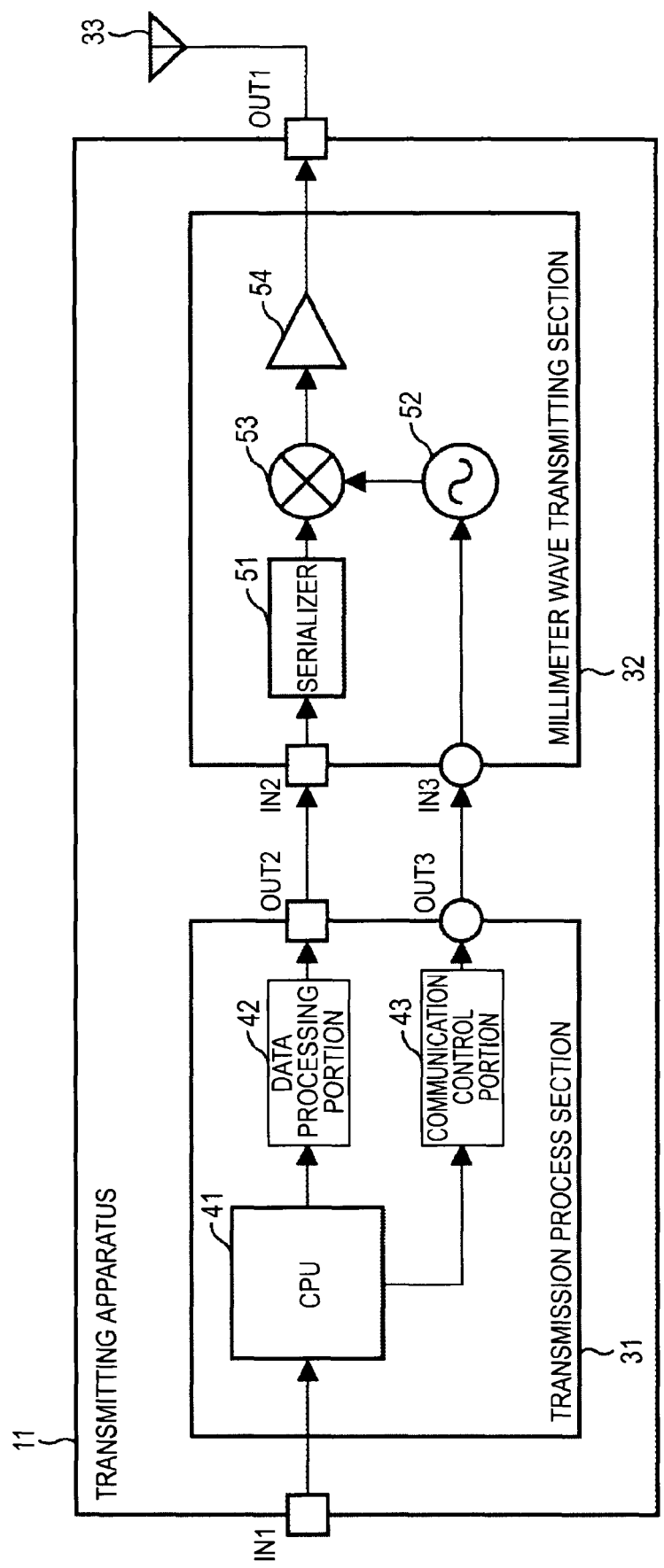
FIG. 2 is a diagram showing an exemplary configuration of a transmitting apparatus.

FIG. 2 is a diagram showing a configuration of the transmitting apparatus 11.

As shown in FIG. 2, the transmitting apparatus 11 includes a transmission process section 31, a millimeter wave transmitting section 32, and an antenna 33.

The transmission process section 31 is connected to the control apparatus 10 through a terminal IN1, and the millimeter wave transmitting section 32 is connected to the antenna 33 through a terminal OUT1. The transmission process section 31 and the millimeter wave transmitting section 32 are connected to each other through a pair of terminals OUT2 and IN2 and another pair of terminals OUT3 and IN3.

The transmission process section 31 includes a CPU 41, a data processing portion 42, and a communication control portion 43.

The CPU 41 controls operations of various parts of the transmission process section 31.

The data processing portion 42 performs predetermined processes on data input through the terminal IN1 under control exercised by the CPU 41 and supplies the data to be transmitted thus obtained to the millimeter wave transmitting portion 32.

The communication control portion 43 supplies control signals to the millimeter wave transmitting portion 32 under control exercised by the CPU 41 to control the millimeter wave transmitting portion 32.

The millimeter wave transmitting portion 32 includes a serializer 51, an oscillator 52, a mixer 53, and an amplifier 54.

The serializer 51 serializes data to be transmitted supplied from the data processing portion 42 and supplies the resultant data to the mixer 53.

The oscillator 52 oscillates to generate a carrier in the millimeter waveband, e.g., a carrier of 56 GHz according to the control signal from the communication control portion 42 and supplies the carrier to the mixer 53.

Thus, the data to be transmitted and the carrier are supplied to the mixer 53 from the serializer 51 and the oscillator 52, respectively. The mixer 53 mixes (multiplies) the data to be transmitted and the carrier to modulate the carrier according to the data to be transmitted, and supplies the modulated signal thus obtained to the amplifier 54.

The modulation of the carrier according to the data to be transmitted is not limited to any particular modulating method. For example, amplitude shift keying may be used.

The amplifier 54 amplifies the modulated signal supplied from the mixer 53 and supplies the resultant signal to the antenna 33.

The antenna 33 outputs the modulated signal from the amplifier 54 as an electric wave.

The transmitting apparatus 11 is configured as thus described.

[Configuration of Receiving Apparatus]

Figure 3:
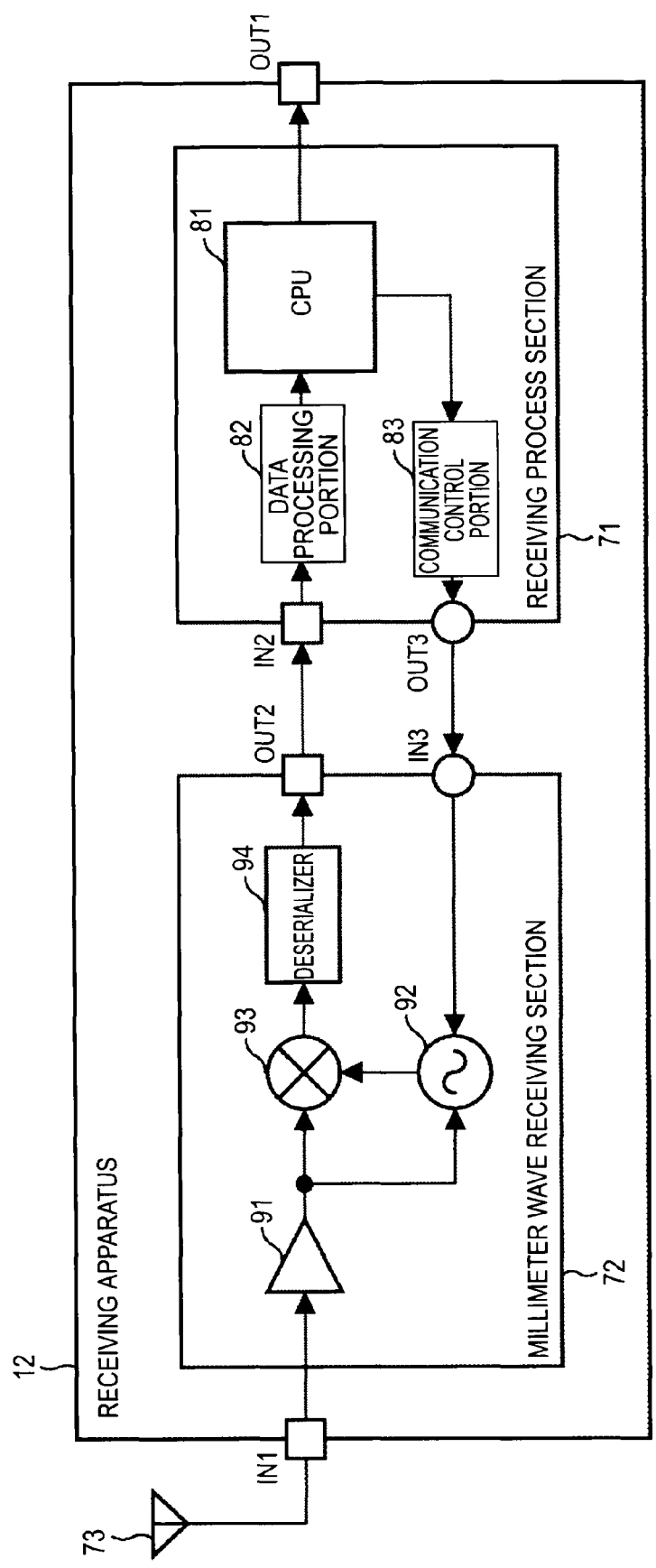
FIG. 3 is a diagram showing an exemplary configuration of a receiving apparatus.

FIG. 3 is a diagram showing a configuration of the receiving apparatus 12.

As shown in FIG. 3, the receiving apparatus 12 includes a receiving process section 71, a millimeter wave receiving section 72, and an antenna 73.

The receiving process section 71 is connected to the data processing apparatus 13 through the terminal OUT1, and the millimeter wave receiving section 72 is connected to the antenna 73 through the terminal IN1. The receiving process section 71 and the millimeter wave receiving section 72 are connected to each other through a pair of terminals IN2 and OUT2 and another pair of terminals OUT3 and IN3.

The antenna 73 receives the modulated signal that is an electric wave transmitted from the transmitting apparatus 11 and supplies the signal to the millimeter wave receiving section 72.

The millimeter wave receiving section 72 includes an amplifier 91, an oscillator 92, a mixer 93, and a deserializer 94.

The amplifier 91 amplifies the modulated signal supplied from the antenna 73 and supplies the resultant signal to the oscillator 92 and the mixer 93.

A control signal from the receiving process section 71 which will be described later is supplied to the oscillator 92 in addition to the modulated signal from the amplifier 91. The oscillator 92 oscillates according to the control signal to generate a carrier in the millimeter waveband, e.g., a carrier of 56 GHz and supplies the carrier to the mixer 93.

The modulated signal and the carrier are supplied to the mixer 93 from the amplifier 91 and the oscillator 92, respectively. The mixer 93 mixes (multiplies) the modulated signal and the carrier to demodulate the carrier according to the modulated signal and supplies a baseband signal thus obtained to the deserializer 94.

The deserializer 94 deserializer the baseband signal supplied from the mixer 93 and supplies the resultant data to the receiving process section 71.

The receiving process section 71 includes a CPU 81, a data processing portion 82, and a communication control portion 83.

The CPU 81 controls operations of various parts of the receiving process section 71.

The data processing portion 82 performs predetermined processes on the data supplied from the deserializer 94 and supplies the data thus obtained to the CPU 81.

The CPU 81 outputs the data supplied from the data processing portion 82 to the data processing apparatus 13 through the terminal OUT1.

Under control exercised by the CPU 81, the communication control portion 83 supplies a control signal to the millimeter wave receiving section 72 to control the millimeter wave receiving section 72.

The receiving apparatus 12 is configured as described above.

[Configuration 1 of Movable Structure]

A description will now be made with reference to FIGS. 4 to 14 on a case in which transmitting apparatus 11 and the receiving apparatus 12 forming the radio communication system 1 as described above are disposed on a movable structure formed as a rotary body rotated by a motor or a movable structure including a rotary body.

First, a description will now be made with reference to FIGS. 4 and 5 on radio communication performed using the same channel between the transmitting apparatus 11 and the receiving apparatus 12 disposed on a movable structure.

Figure 4:
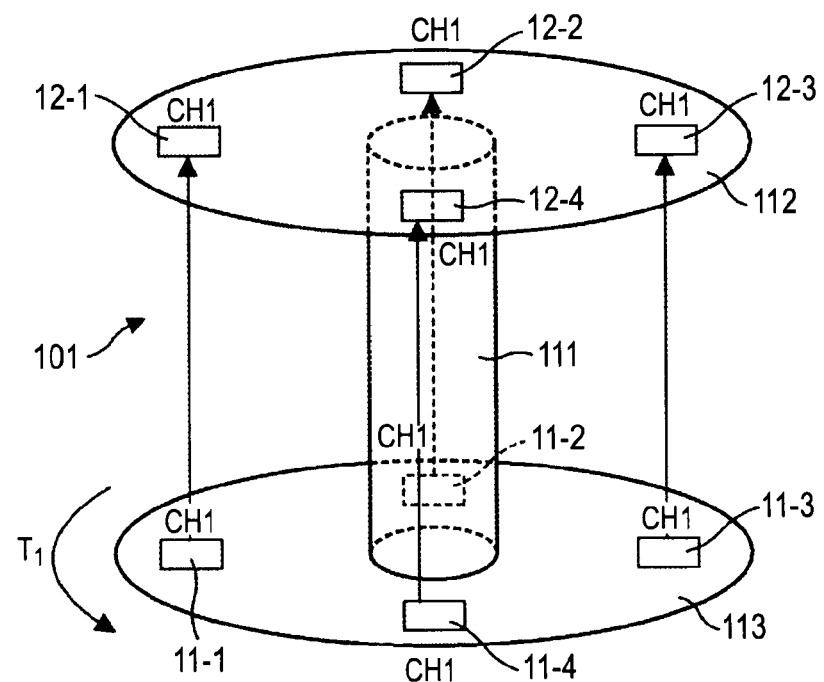
FIG. 4 is an illustration showing an exemplary configuration of a movable structure for performing radio communication using the same channel.

FIG. 4 is an illustration showing an exemplary configuration of a movable structure for performing radio communication using the same channel.

A movable structure 101 is rotated by a motor (not shown) in the direction indicated by an arrow T1 in FIG. 4 or in the direction opposite to the direction of the arrow. The movable structure 101 is formed by a top disc 112 and a bottom disc 113 which are secured together by a column 111 in the form of a hollow cylinder. In the middle of the top disc 112 and the bottom disc 113, circular openings are provided corresponding to both end faces of the column 111. The interior of the column 111 opens to the outside in the vertical direction of FIG. 4. Thus, the movable structure 101 is formed as a rotary body.

The receiving apparatus 12-1 to 12-4 are disposed at equal angular intervals along the outer circumference of a bottom surface of the top disc 112. The transmitting apparatus 11-1 to 11-4 are disposed along the outer circumference of a top surface of the bottom disc 113. The transmitting apparatus 11-1 to 11-4 and the receiving apparatus 12-1 to 12-4 are disposed in such positions on the bottom surface of the top disc 112 and the top surface of the bottom disc 113 that they face each other respectively.

The transmitting apparatus 11-1 and the receiving apparatus 12-1 are disposed to operate as a pair, and radio communication is performed in the millimeter waveband to transmit date from the transmitting apparatus 11-1 and to receive the data at the receiving apparatus 12-1.

Similarly, the transmitting apparatus 11-2 to 11-4 and the receiving apparatus 12-2 to 12-4 are disposed in such positions on the movable structure 101 that the apparatus face each other respectively. Radio communication is performed in the millimeter waveband to transmit date from the transmitting apparatus 11-2 to 11-4 and to receive the data at the receiving apparatus 12-2 to 12-4.

Radio communication is performed between each pair of the transmitting apparatus 11 and the receiving apparatus 12 facing each other using the same channel as used by the other pairs. In this case, the communication control portion 43 of the each transmitting apparatus 11 controls the millimeter wave transmitting portion 32 to transmit data at the same frequency as used by the other pairs. The communication control portion 83 of the receiving apparatus 12 disposed opposite to the transmitting apparatus controls the millimeter wave receiving portion 72 thereof to receive the data at the same frequency as used by the other pairs.

The each of the transmitting apparatus 11 and the each of the receiving apparatus 12 are disposed at equal angular intervals, and certain intervals are kept between the pairs of the transmission and the receiving apparatus. Therefore, even when radio communication is performed between one pair of the apparatus using the same channel as used by the other pairs of the apparatus, the frequency used can be spatially separated. Thus, when radio communication is performed between each pair of the apparatus using the same channel, interference between the pairs can be prevented.

Figure 5:
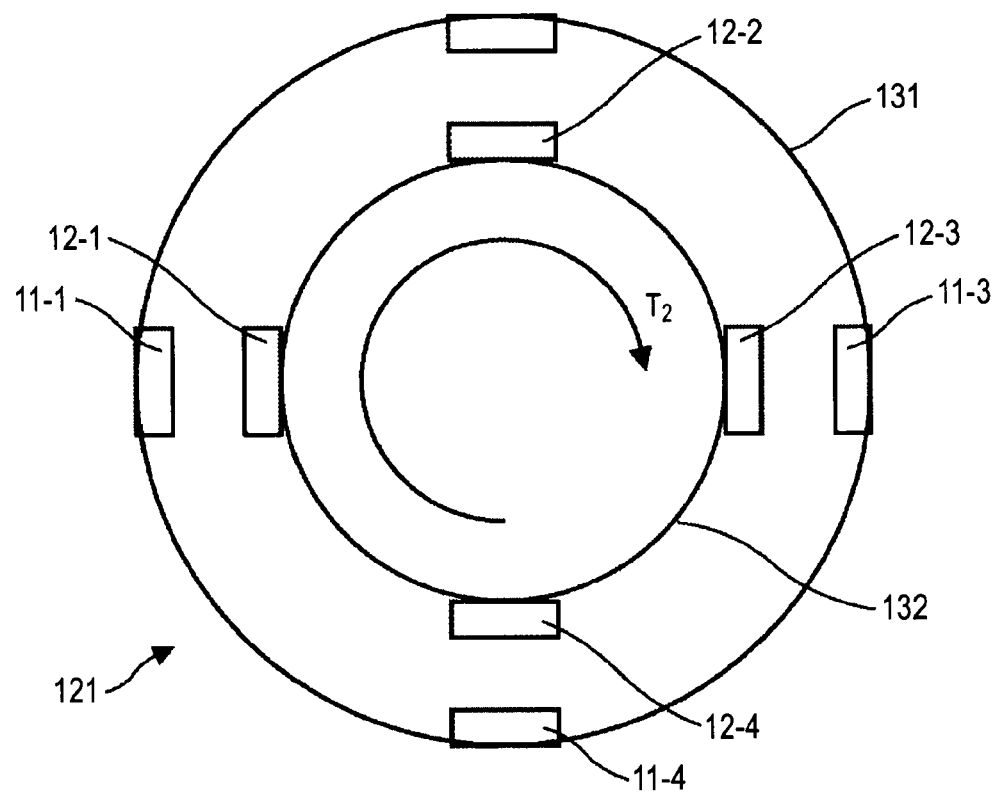
FIG. 5 is an illustration showing another exemplary configuration of a movable structure for performing radio communication using the same channel.

FIG. 5 is a plan view of a movable structure 121 which is formed by a fixed member 131 and a rotary body 132 rotating on the fixed member 131.

The transmitting apparatus 11-1 to 11-4 are disposed on the fixed member 131 at equal angular intervals along the outer circumference of the member. The receiving apparatus 12-1 to 12-4 are disposed on a side surface of the rotary body 132 at equal angular intervals.

The rotary body 132 is rotated on the fixed member 131 by a motor (not shown) in the direction indicated by an arrow T2 in FIG. 5 or in the direction opposite to the direction of the arrow. When the movable structure is rotated to enter a state as shown in FIG. 5, radio communication is performed between the each pair of the apparatus. Since certain intervals are kept between the respective pairs of the apparatus, even when radio communication is performed between one pair of the apparatus using the same channel as used by the other pairs of the apparatus, the frequency used can be spatially separated, and interference can therefore be suppressed.

FIG. 5 shows an exemplary state in which radio communication is performed between the transmitting apparatus 11-1 and the receiving apparatus 12-1. Alternatively, radio communication may be performed between the transmitting apparatus 11-1 and any of the receiving apparatus 12-2 to 12-4 when the receiving apparatus is rotated into the neighborhood of the region facing the transmitting apparatus 11-1 where radio communication is enabled. Similarly, radio communication may alternatively be performed between the transmitting apparatus 11-2 and any of the receiving apparatus 12-1, 12-3, and 12-4, between the transmitting apparatus 11-3 and any of the receiving apparatus 12-1, 12-2, and 12-4, and between the transmitting apparatus 11-4 and any of the receiving apparatus 12-1, 12-2, and 12-3 depending on how the rotary body 132 is rotated.

The movable structure 121 shown in FIG. 5 has been described on the case in which the rotary body 132 is rotated on the fixed member 131. However, the present disclosure is not limited to it, and may have an alternative configuration for allowing either or both of the fixed member 131 and the rotary body 132 to be rotated. In this case, the fixed member 131 and the rotary body 132 are provided on the same axis of rotation. Specifically, the fixed member 131 and the rotary body 132 are provided such that they can be moved relative to each other, and radio communication is enabled between the transmitting apparatus 11 and the receiving apparatus 12 when they face each other as a result of the relative movement of the fixed member 131 and the rotary body 132.

As described above, when radio communication is performed using the same channel, the frequency used is spatially separated between the pairs of the communicating apparatus because certain intervals are kept between the pairs of the apparatus, and interference can therefore be prevented. As a result, radio communication can be performed with high reliability.

[Configuration 2 of Movable Structure]

A description will now be made with reference to FIGS. 6 and 7 on radio communication performed using different channels between transmitting apparatus 11 and receiving apparatus 12 disposed on a movable structure.

Figure 6:
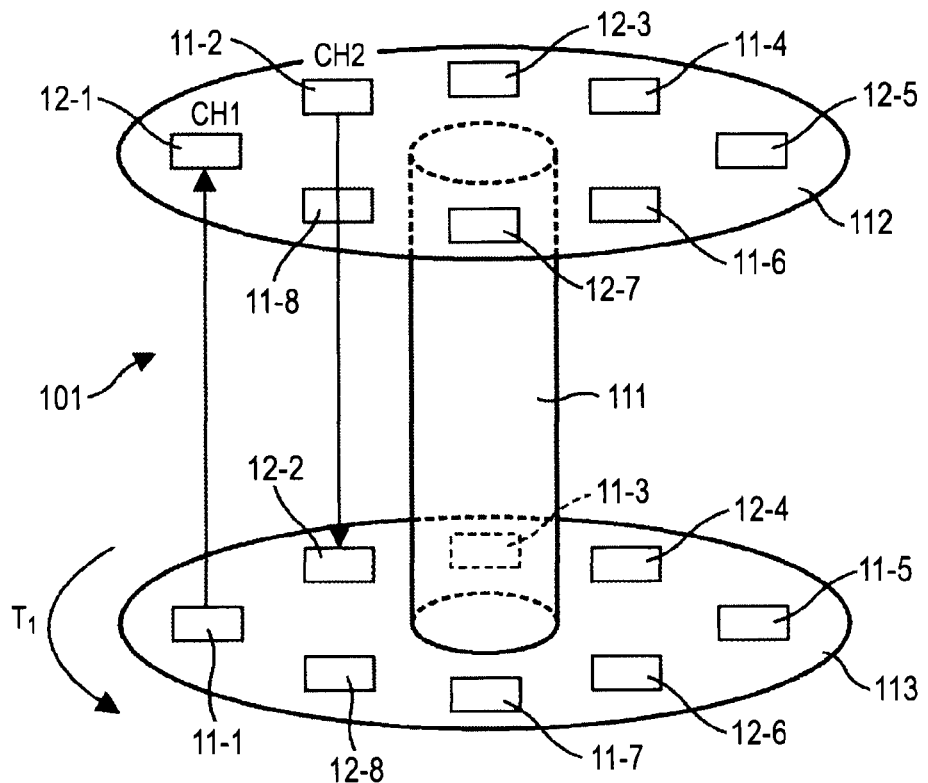
FIG. 6 is an illustration showing an exemplary configuration of a movable structure for performing radio communication using different channels.

FIG. 6 is an illustration showing an exemplary configuration of a movable structure 101 for performing radio communication using different channels.

The movable structure 101 shown in FIG. 6 is configured as a rotary body similar to the movable structure 101 shown in FIG. 4.

Receiving apparatus 12 and transmitting apparatus 11 are alternately disposed at equal angular intervals along the outer circumference of a bottom surface of a top disc 112. Transmitting apparatus 11 and receiving apparatus 12 are alternately disposed at equal angular intervals along the outer circumference of a top surface of a bottom disc 113. The transmitting apparatus 11 and the receiving apparatus 12 are disposed in such positions on the bottom surface of the top disc 112 and the top surface of the bottom disc 113 that they face each other respectively.

Radio communication is performed between a transmitting apparatus 11-1 and a receiving apparatus 12-1. Thus, data transmitted from the transmitting apparatus 11-1 is received by the receiving apparatus 12-1 disposed in a position to face the transmitting apparatus 11-1.

Similarly, radio communication in the millimeter waveband is performed between transmitting apparatus 11-2 to 11-8 and receiving apparatus 12-2 to 12-8. Thus, data transmitted from the transmitting apparatus 11-2 to 11-8 is received by the respective receiving apparatus 12-2 to 12-8 disposed in positions to face the transmitting apparatus 11-2 to 11-8.

Radio communication between each pair of the transmitting apparatus 11 and receiving apparatus 12 facing each other is performed using a channel different from channels used by other pairs of the apparatus. In this case, the communication control portion 43 of the each transmitting apparatus 11 controls the millimeter wave transmitting portion 32 to transmit data at a frequency different from those used between the other pairs of the apparatus. The communication control portion 83 of the receiving apparatus 12 disposed opposite to the transmitting apparatus controls the millimeter wave receiving portion 72 thereof to receive the data at the frequency different from those used by the other pairs of apparatus.

Since radio communication between the each pair of the apparatus is performed using a channel different from channels used by the other pairs of the apparatus, frequency separation is achieved when radio communication is performed between the pairs of the apparatus. It is therefore possible to prevent interference with radio communication performed between the each pair of the apparatus. When the each pair of the apparatus uses a channel different from channels used by the other pairs of the apparatus, there is no need for keeping the pairs of the apparatus away from each other. Thus, the intervals between the pairs of the apparatus may be made smaller than those in the above-described configuration for using the same channel, and a greater number of pairs of apparatus can therefore be disposed on the movable structure.

Figure 7:
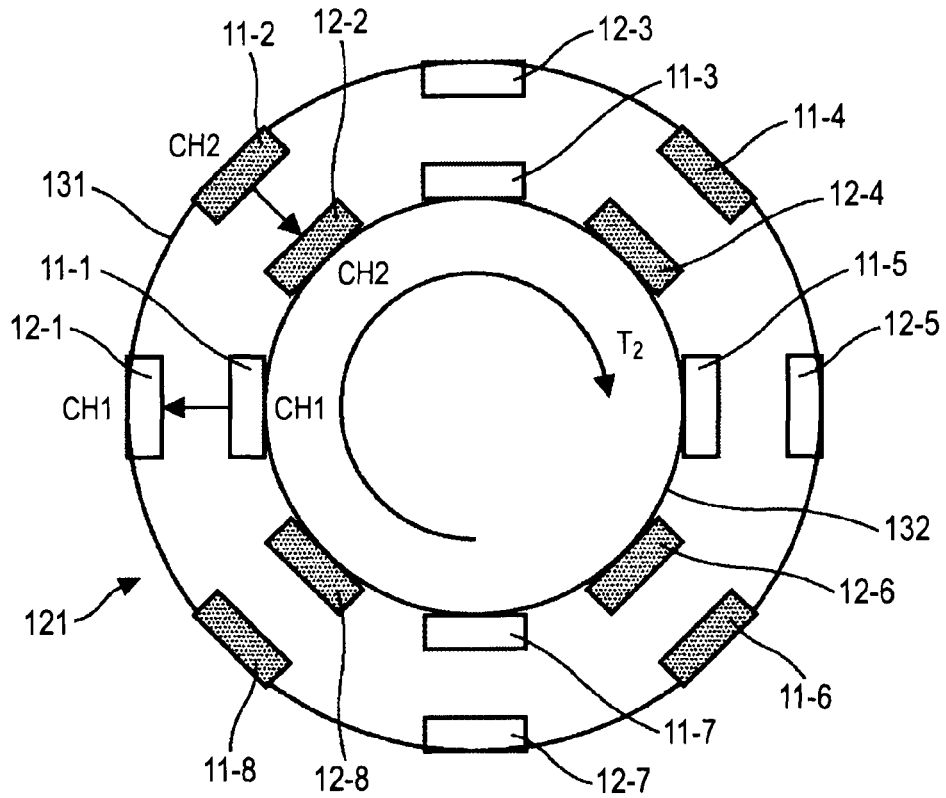
FIG. 7 is an illustration showing another exemplary configuration of a movable structure for performing radio communication using different channels.

FIG. 7 is a plan view of the movable structure 121 formed by the fixed member 131 and the rotary body 132.

The receiving apparatus 12 and the transmitting apparatus 11 are disposed on the fixed member 131 such that they alternate at equal angular intervals along the outer circumference of the member. The transmitting apparatus 11 and the receiving apparatus 12 are alternately disposed on a side surface of the rotary body 132 at equal angular intervals.

The rotary body 132 is rotated in the direction indicated by an arrow T2 in FIG. 7 or in the direction opposite to the direction of the arrow. When the movable structure takes a state as shown in FIG. 7 in which the transmitting apparatus 11 and the receiving apparatus 12 face each other, radio communication is performed between the each pair of the apparatus facing each other. Since radio communication between the each pair of the apparatus facing each other is performed using a channel different from channels used by the other pairs of the apparatus, frequency separation can be achieved to suppress interference.

As described above, when radio communication is performed using different channels, frequency separation can be achieved to prevent interference at the each pair of the apparatus because radio communication is performed using a channel different from channels used by the other pairs of apparatus. As a result radio communication can be performed reliably.

Likewise in the description made above with reference to FIG. 5, the movable structure 121 shown in FIG. 7 is not limited to the configuration in which the rotary body 132 is rotated. An alternative configuration may be employed to allow either or both of the fixed member 131 and the rotary body 132 to be rotated.

[Configuration 3 of Movable Structure]

A description will now be made with reference to FIGS. 8 to 11 on an exemplary mode of implementation in which radio communication is performed between transmitting apparatus 11 and receiving apparatus 12 disposed on a movable structure using information for identifying each apparatus (hereinafter the information will be referred to as "terminal information").

Figure 8:
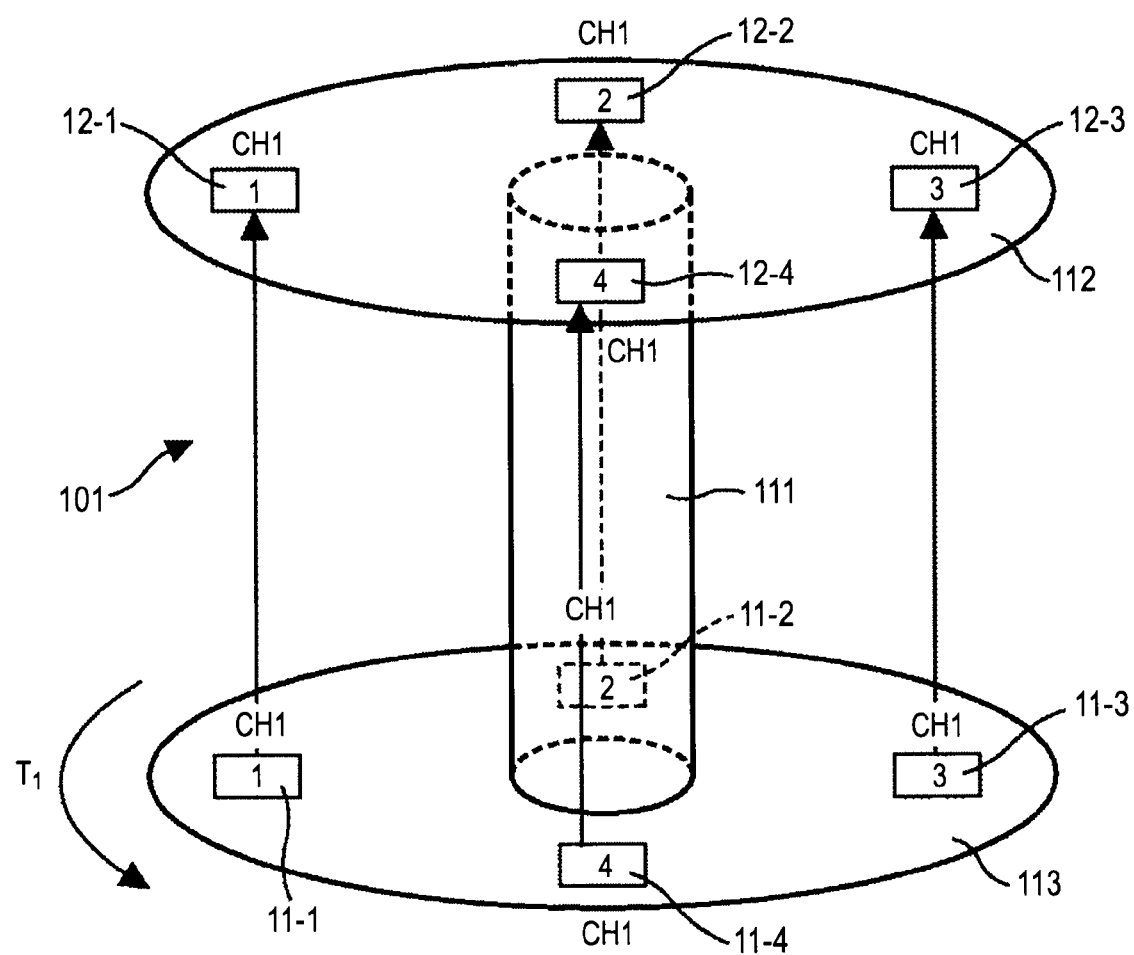
FIG. 8 is an illustration showing an exemplary configuration of a movable structure for radio communication using terminal information.

FIG. 8 is an illustration showing an exemplary configuration of a movable structure for radio communication using terminal information.

A movable structure 101 shown in FIG. 8 is formed as a rotary body similar to the movable structure 101 shown in FIG. 6. Receiving apparatus 12-1 to 12-4 and transmitting apparatus 11-1 to 11-4 are disposed on a top disc 112 and a bottom disc 113 of the structure, respectively, the receiving and transmitting apparatus being disposed to face each other.

Radio communication is performed between each pair of the apparatus facing each other using the same channel as used by the other pairs of the apparatus. In this case, radio communication is performed between the each pair of the apparatus using the same frequency. By adding terminal information to data to be transmitted, the terminal information can be transmitted through radio communication only between one pair of the transmitting apparatus and the receiving apparatus, e.g., between only the transmitting apparatus 11-1 and the receiving apparatus 12-1.

Similarly, by adding terminal information to data to be transmitted, the terminal information can be transmitted through only between the pair of the transmitting apparatus 11-2 and the receiving apparatus 12-2, only between the pair of the transmitting apparatus 11-3 and the receiving apparatus 12-3, or only between the pair of the transmitting apparatus 11-4 and the receiving apparatus 12-4.

For example, such terminal information is supplied by the control apparatus 10 controlling radio communication between the transmitting apparatus 11 and the receiving apparatus 12. Alternatively, terminal information may be set for each of the transmitting apparatus 11 and the receiving apparatus 12 in advance.

When radio communication is performed using terminal information as described above, radio communication can be performed only between particular apparatus according to the terminal information.

[Flow of Process of Transmitting Data with Terminal Information]

A process performed by the transmitting apparatus 11 for transmitting data with terminal information will now be described with reference to the flow chart shown in FIG. 9.

At step S11, the data processing portion 42 generates data to be transmitted to the receiving apparatus 12 based on data input from the CPU 41.

At step S12, the CPU 41 acquires terminal information associated with the transmitting apparatus 11 (transmitter) and supplies the information to the data processing portion 42. For example, the terminal information may be supplied from the control apparatus 10, or the information may alternatively be set in the transmitting apparatus 11 in advance.

At step S13, the data processing portion 42 adds the terminal information to the data to be transmitted generated as described above according to an instruction from the CPU 41.

Figure 10:
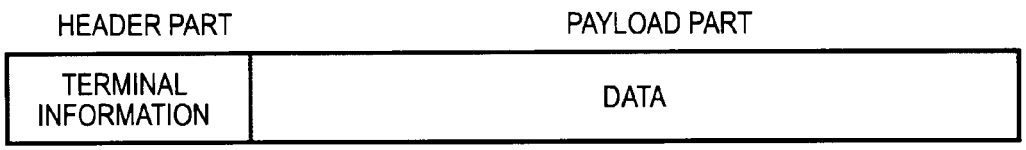
FIG. 10 is an illustration showing a format of data with terminal information.

FIG. 10 is an illustration showing a format of data with terminal information.

As shown in FIG. 10, data with terminal information includes a header part and a payload part.

Terminal information is included in the header part. The receiving apparatus 12 can determine whether the data is addressed to the receiving apparatus itself by referring to terminal information included in the header part of the data. Transmitted data is included in the payload part.

Figure 9:
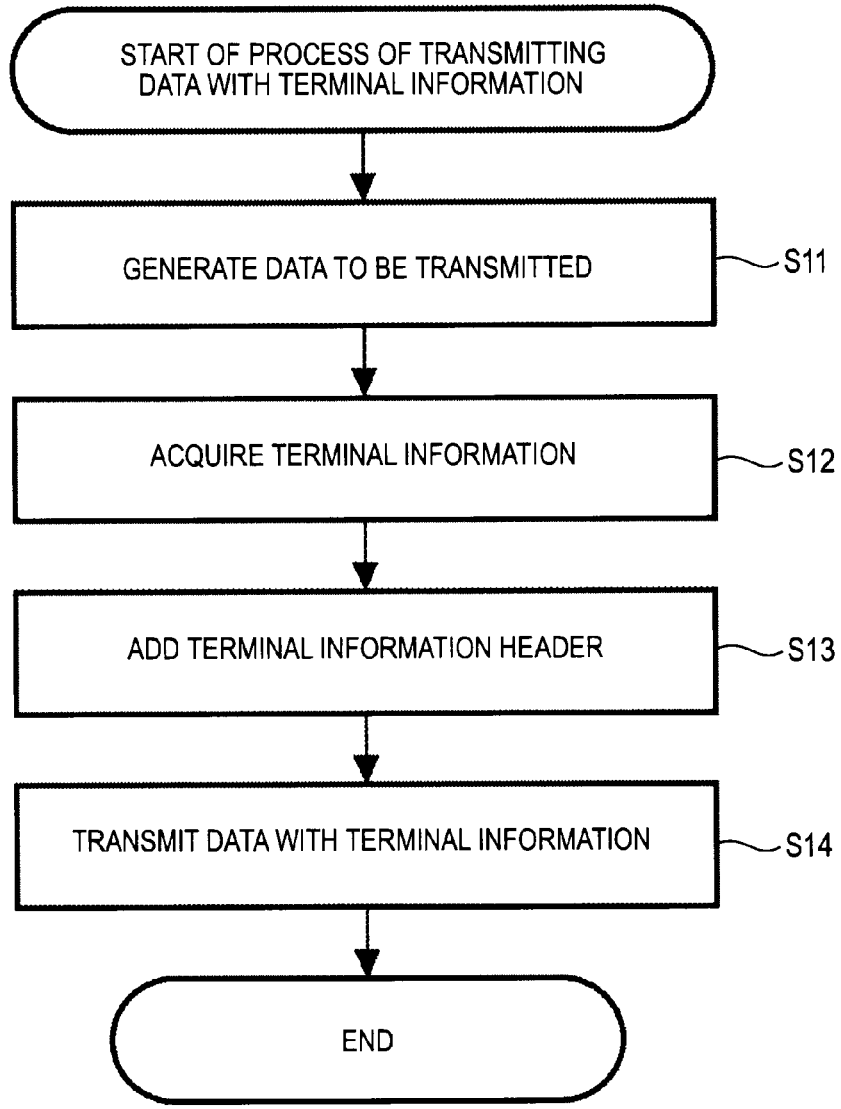
FIG. 9 is a flow chart for explaining a process of transmitting data with terminal information.

Referring again to the flow chart shown in FIG. 9, at step S14, the millimeter wave transmitting portion 32 transmits a modulated signal representing the data with terminal information generated by the data processing portion 42 to the receiving apparatus 12 under control exercised by the communication control portion 43.

As described above, in the process of transmitting the data with terminal information, the terminal information associated with the transmitting apparatus 11 is added to the data to be transmitted, and the resultant data with terminal information is transmitted to the receiving apparatus 12.

[Flow of Process of Receiving Data with Terminal Information]

A process of receiving performed by the receiving apparatus 12 for receiving the data with terminal information will now be described with reference to the flow chart in FIG. 11.

When the data with terminal information is transmitted from the transmitting apparatus 11, the millimeter wave receiving portion 72 receives the modulated signal representing the data with terminal information transmitted from the transmitting apparatus 11 under control exercised by the communication control portion 83 at step S31.

At step S32, the data processing portion 82 detects the header part of the data with terminal information obtained by demodulating the modulated signal received by the millimeter wave receiving portion 72.

At step S33, the CPU 81 determines whether the header part has been detected from the data with terminal information, based on the detection result of the header part by the data processing portion 82.

When it is determined at step S33 that the header part has not been detected, the flow returns to step S31 to repeat the process of receiving the data with terminal information and the process of detecting the header part.

When it is determined at step S33 that the header part has been detected, the flow proceeds to step S34. At step S34, the CPU 81 determines whether the terminal information included in the header part indicates that the transmitted data is addressed to the receiving apparatus.

When it is determined at step S34 that the terminal information does not indicate that the transmitted data is addressed to the receiving apparatus, the flow proceeds to step S35. At step S35, the CPU 81 controls the data processing portion 82 to cause it to discard the data with terminal information. Thereafter, the flow returns to step S31 at which the process of receiving data with terminal information is performed again.

When it is determined at step S34 that the terminal information indicates that the transmitted data is addressed to the receiving apparatus, the flow proceeds to step S36.

For example, when the terminal information (which may be "1", for example) of the transmitting apparatus (transmitter) included in the header information agrees with the terminal information (which may be "1", for example) of the receiving apparatus (destination) supplied from the control apparatus 10, it is determined that the transmitted data is addressed to the receiving apparatus. As described above, the terminal information of the receiving apparatus 12 may be set in advance.

The CPU 81 supplies the data with terminal information to the data processing apparatus 13. At step S36, the data processing apparatus 13 performs predetermined processes on the data with terminal information addressed to the data processing apparatus supplied from the CPU 81.

As thus described, at the process of receiving the data with terminal information, data processing is performed only when it is determined from the terminal information that the data with terminal information is addressed to the data processing apparatus. As a result, radio communication can be reliably performed between the particular apparatus.

[Configuration 4 of Movable Structure]

A description will now be made with reference to FIGS. 12 to 14 on a case in which radio communication is performed between the transmitting apparatus 11 and the receiving apparatus 12 disposed on a rotary body using information on a driving position (rotating position) of the rotary body (the information will be hereinafter referred to as "position information").

An exemplary mode of implementation in which terminal information is added to data to be transmitted has been described above in association with the movable structure 101 shown in FIG. 8. Alternatively, position information instead of terminal information, may be added to data to be transmitted. In this case, the movable structure has basically the same configuration as that of the movable structure 101 shown in FIG. 8. Therefore, the configuration will not be described.

[Flow of Process of Transmitting Data with Position Information]

A process performed by the transmitting apparatus 11 for transmitting data with position information will now be described with reference to the flow chart shown in FIG. 12.

At step S51, similar to step S11 shown in FIG. 9, the data processing portion 42 generates data to be transmitted.

At step S52, the CPU 41 acquires position information associated with the movable body 101 and supplies the information to the data processing portion 42. For example, the position information of the movable body 101 is detected by a rotation angle sensor attached to the movable body 101 and supplied from the control apparatus 10.

At step S53, the data processing portion 42 adds the position information to the data to be transmitted generated as described above according to an instruction from the CPU 41.

Figure 13:
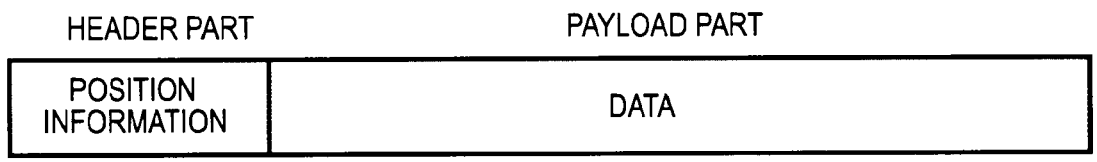
FIG. 13 is an illustration showing a format of data with position information.
Figure 14:
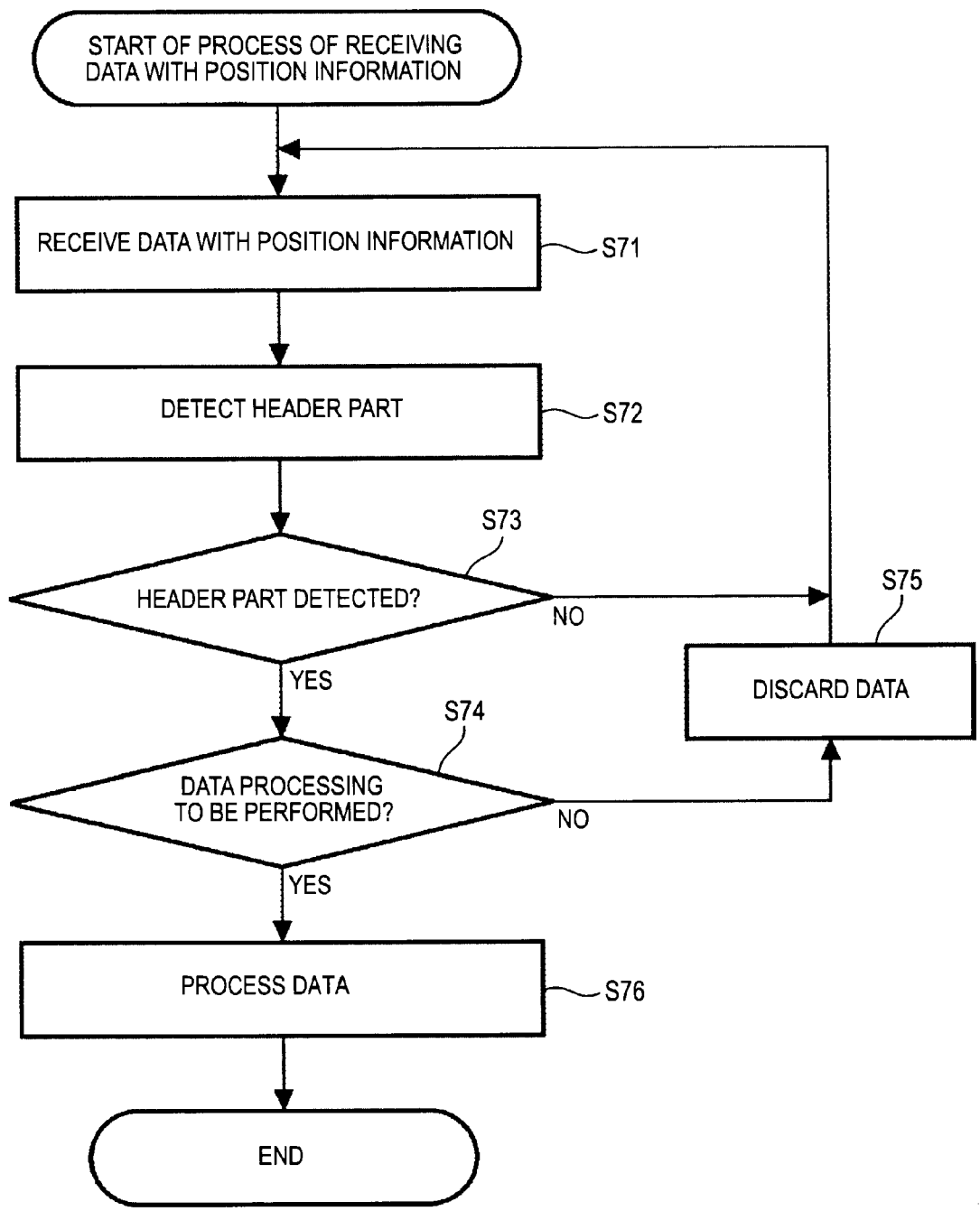
FIG. 14 is a flow chart for explaining a process of receiving data with position information.

FIG. 13 is an illustration showing a format of the data with position information.

As shown in FIG. 13, the data with position information includes a header part and a payload part.

Position information is included in the header part. The receiving apparatus 12 can determine whether predetermined processes are to be performed on the data or not by referring to position information included in the header part of the data. Transmitted data is included in the payload part.

Figure 12:
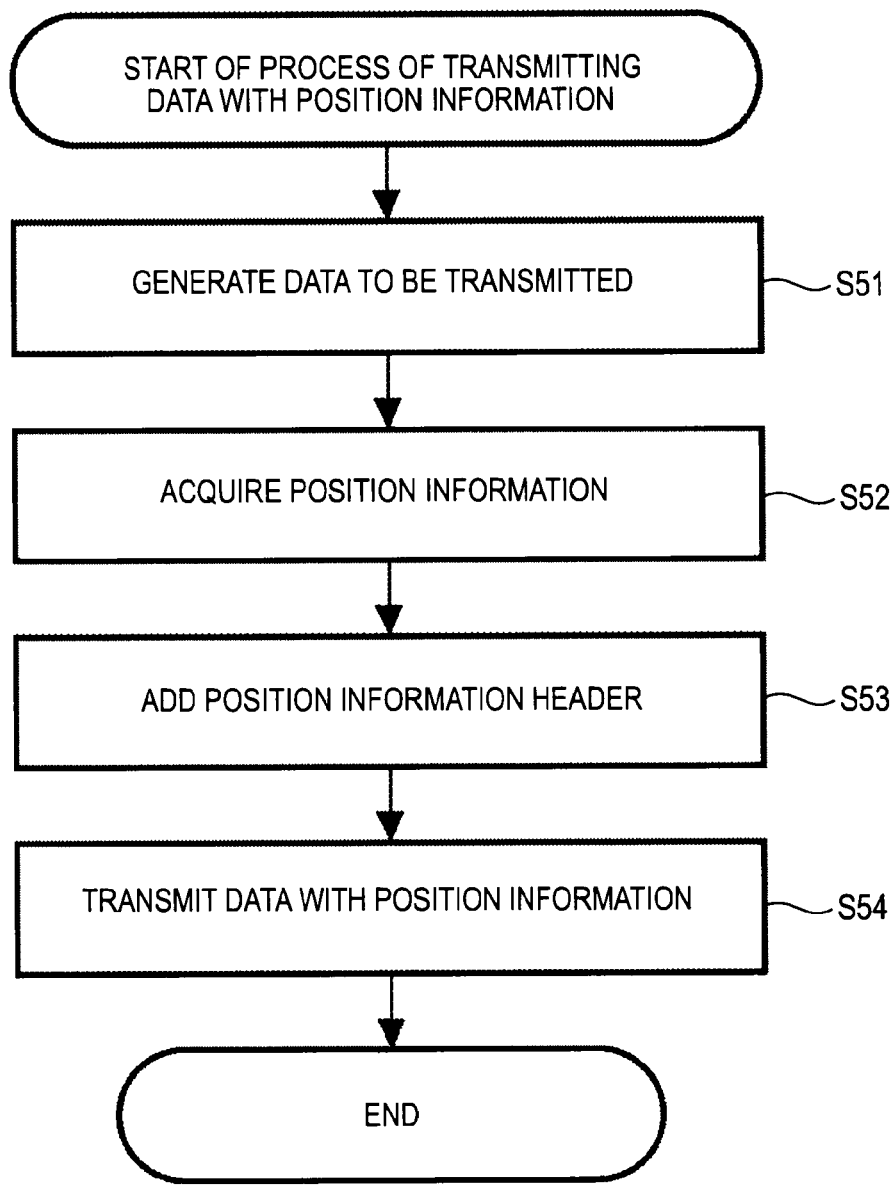
FIG. 12 is a flow chart for explaining a process of transmitting data with position information.

Referring again to the flow chart shown in FIG. 12, at step S54, the millimeter wave transmitting portion 32 transmits a modulated signal representing the data with position information generated by the data processing portion 42 to the receiving apparatus 12 under control exercised by the communication control portion 43.

As described above, in the process of transmitting the data with position information, the position information associated with the movable structure 101 is added to the data to be transmitted, and the resultant data with position information is transmitted to the receiving apparatus 12.

[Flow of Process of Receiving Data with Position Information]

A process performed by the receiving apparatus 12 for receiving the data with position information will now be described with reference to the flow chart in FIG. 14.

When the data with position information is transmitted from the transmitting apparatus 11, the millimeter wave receiving portion 72 receives the modulated signal representing the data with position information transmitted from the transmitting apparatus 11 under control exercised by the communication control portion 83, at step S71.

Figure 11:
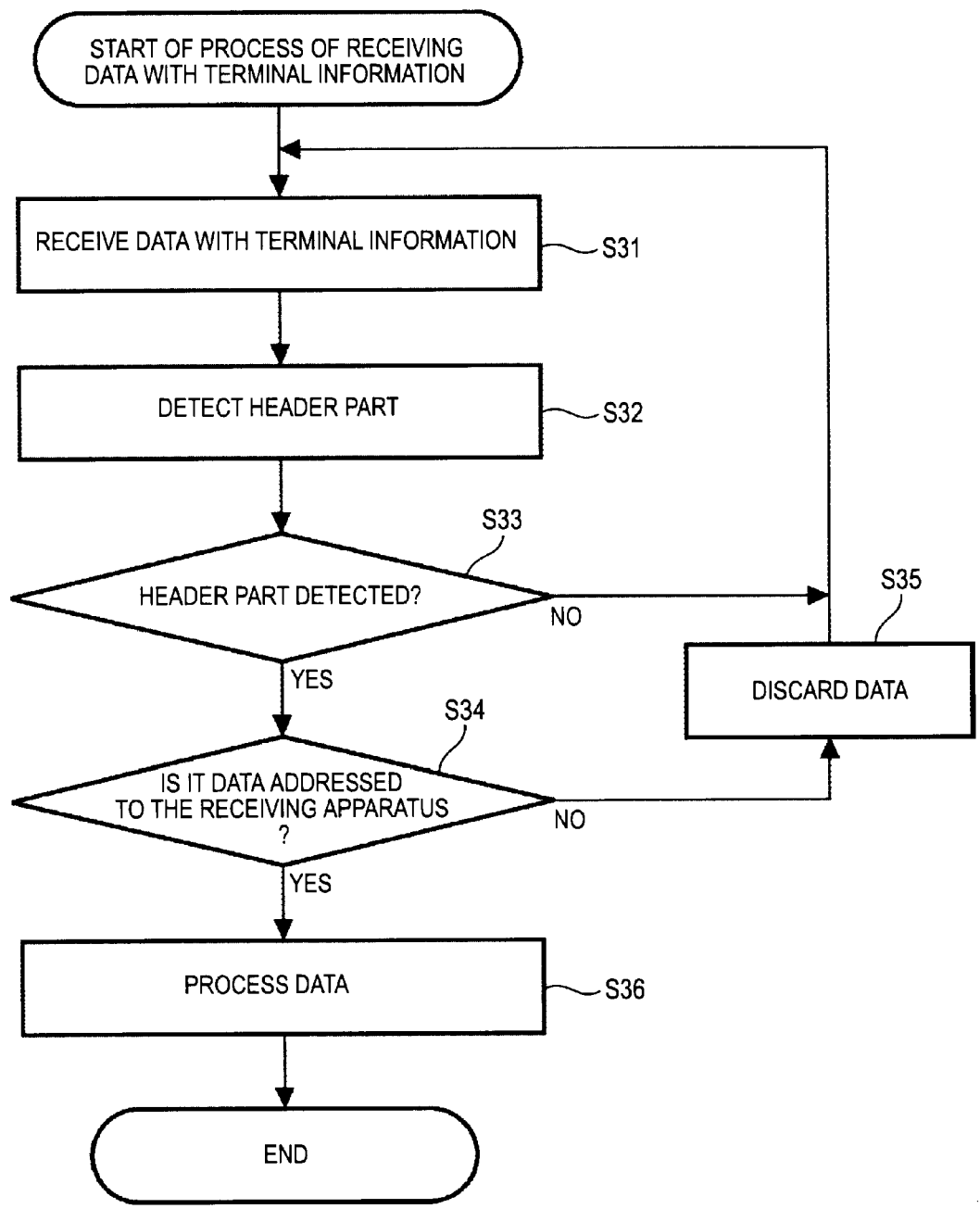
FIG. 11 is a flow chart for explaining a process of receiving data with terminal information.

At steps S72 and S73, similar to steps S32 and S33 shown in FIG. 11, a process of determining whether the header part has been detected or not is performed. When it is determined at step S73 that the header part has been detected, the flow proceeds to step S74.

At step S74, the CPU 81 determines whether data processing is to be performed or not based on the position information included in the header part.

When it is determined at step S74 that data processing is not to be performed, the flow proceeds to step S75. At step S75, the CPU 81 controls the data processing portion 82 to cause it to discard the data with position information.

On the other hand, when it is determined at step S74 that data processing is to be performed, the flow proceeds to step S76.

For example, when the position information included in the header part agrees with the position information supplied from the control apparatus 10, it is determined that data processing is to be performed. As described above, the position information of the receiving apparatus 12 may be set in advance.

The CPU 81 supplies the data with position information to the data processing apparatus 13. At step S76, the data processing apparatus 13 performs predetermined processes on the data with position information supplied from the CPU 81.

As described above, at the process of receiving the data with position information, the data is processed only when it is determined from the position information that the movable structure 101 has come to a particular position.

As thus described, when radio communication is performed using position information, the data processing apparatus 13 are enabled for data processing only when it is determined from the position information that the movable structure 101 has come to a particular position. As a result, radio communication can be reliably performed between particular apparatus.

Examples in which terminal information and position information are added as a header part of data separately from each other have been described above. Alternatively, both of the terminal information and position information may be added to the same data to be transmitted. In that case, the transmitting apparatus 11 transmits data added with terminal information and position information, and the terminal information and the position information are received by the receiving apparatus 12, and data processing is performed according to such information.

A description has been made above on the case in which the transmitting apparatus 11 transmits data with position information and the receiving apparatus 12 performs data processing according to the position information detected from the data. Alternatively, the transmitting apparatus 11 may perform processes according to the position information. For example, the transmitting apparatus 11 may transmit the data to the receiving apparatus 12 only when it is determined from the position information obtained from the movable structure 101 that the movable structure 101 has reached a predetermined position. In this case, the receiving apparatus 12 does not perform the header part detecting process and the position information determining process, but only performs data processing on the received data.

Second Embodiment

Configuration of Radio Communication System

Figure 15:
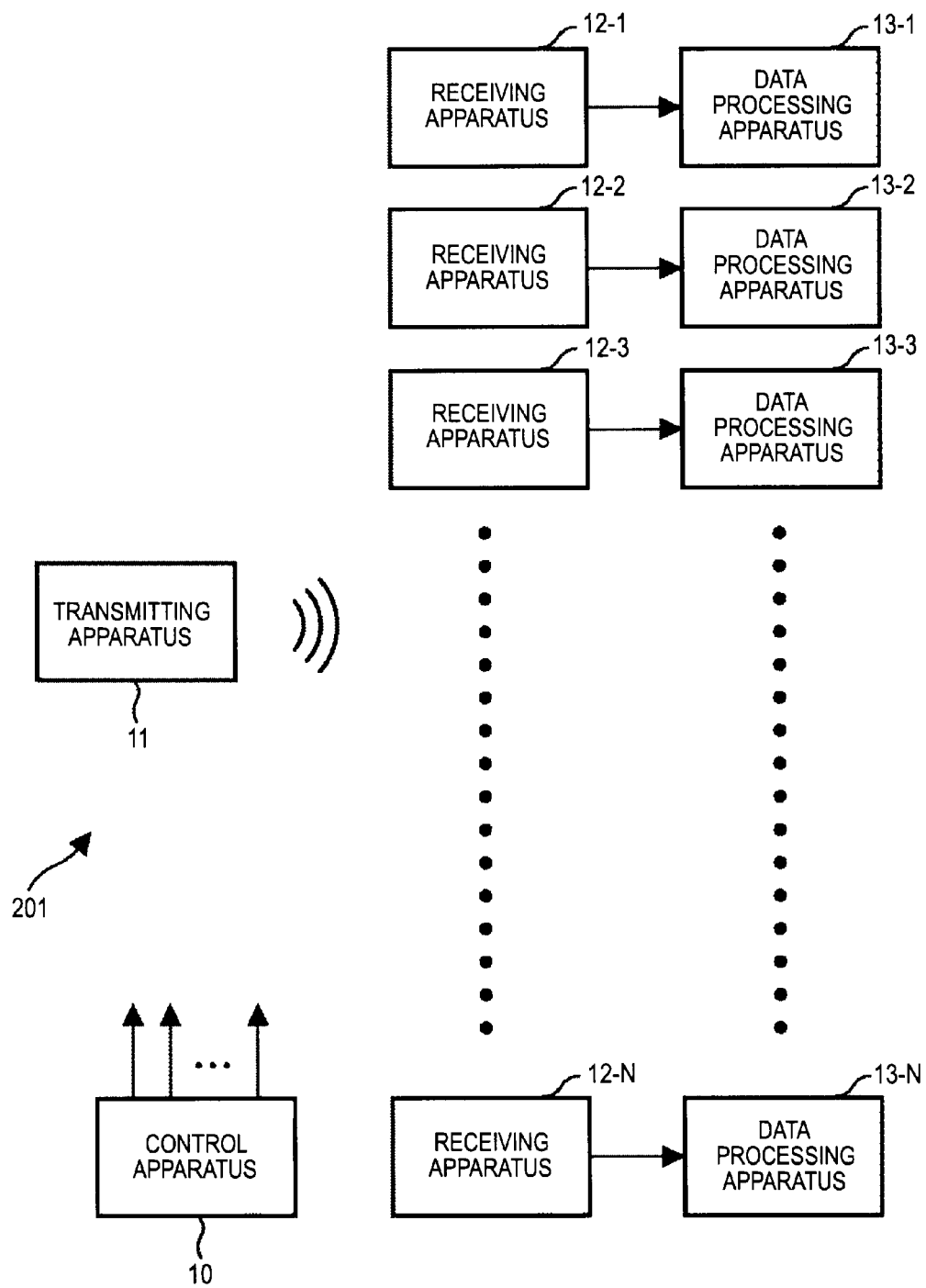
FIG. 15 is an illustration showing another exemplary configuration of a radio communication system.

FIG. 15 is an illustration showing another exemplary configuration of a radio communication system embodying the technique disclosed herein.

As shown in FIG. 15, a radio communication system 201 includes a control apparatus 10, a transmitting apparatus 11, receiving apparatus 12-1 to 12-N, and data processing apparatus 13-1 to 13-N.

The radio communication system 201 shown in FIG. 15 includes only one transmitting apparatus 11, whereas the radio communication system 1 shown in FIG. 1 includes N transmitting apparatus. Therefore, the transmitting apparatus 11 and the receiving apparatus 12 of the present embodiment are in a one-to-many relationship.

Data is transmitted and received between the transmitting apparatus 11 and the receiving apparatus 12-1 to 12-N through radio communication using, for example, millimeter waves.

The control apparatus 10, the receiving apparatus 12-1 to 12-N, and the data processing apparatus 13-1 to 13-N will not be described because they have the same configurations as described with reference to FIG. 1.

The radio communication system 201 is configured as described above.

[Configuration 5 of Movable Structure]

A description will now be made with reference to FIG. 16 on a case in which the transmitting apparatus 11 and the receiving apparatus 12 forming the radio communication system 201 as described above are disposed on a movable structure.

Figure 16:
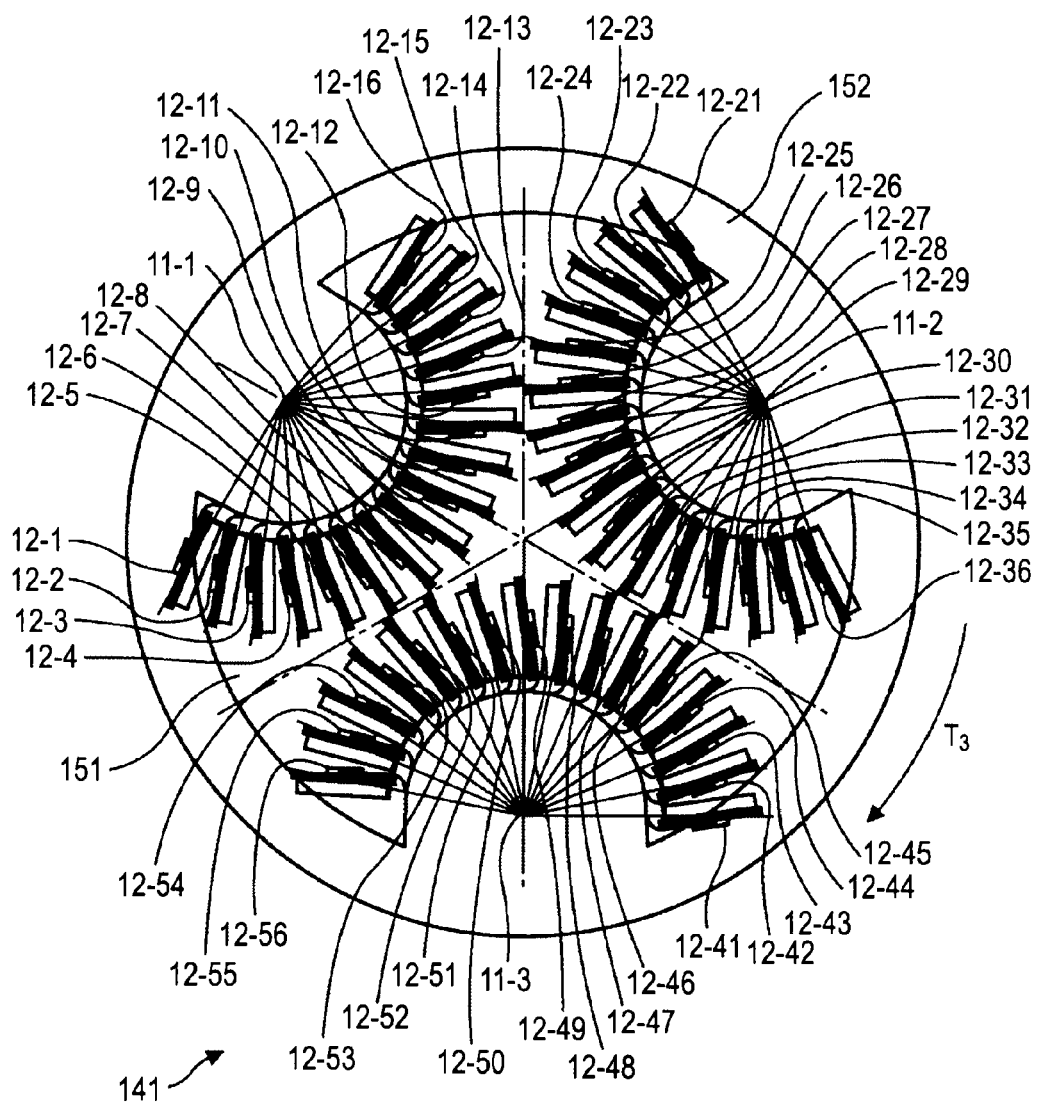
FIG. 16 is an illustration showing an exemplary configuration of a movable structure to be used for radio communication between transmitting apparatus and receiving apparatus in a one-to-many relationship.

FIG. 16 is an illustration showing an exemplary configuration of a movable structure to be used for radio communication between the transmitting apparatus and receiving apparatus in a one-to-many relationship.

FIG. 16 is a plan view of a movable structure 141 formed by a fixed member 151 and a rotary body 152 which is provided on the fixed member and rotated in the direction indicated by an arrow T3 in the figure or in the direction opposite to the direction of the arrow.

The transmitting apparatus 11-1 to 11-3 are disposed at equal angular intervals along the outer circumference of the fixed member 151. The receiving apparatus 12-1 to 12-16, receiving apparatus 12-21 to 12-36, and receiving apparatus 12-41 to 12-56 are disposed on the rotary body 152.

Radio communication in the millimeter waveband is performed among a first group of apparatus, i.e., between the transmitting apparatus 11-1 and the receiving apparatus 12-1 to 12-16. Thus, data transmitted from the transmitting apparatus 11-1 is received by each of the receiving apparatus 12-1 to 12-16. At this time, radio communication may be performed between the transmitting apparatus 11-1 and the receiving apparatus 12-1 to 12-16 using either the same channel or different channels.

Similarly, radio communication in the millimeter waveband is performed among a second group of apparatus, i.e., between the transmitting apparatus 11-2 and the receiving apparatus 12-21 to 12-36 using the same channel or different channels. Thus, data transmitted from the transmitting apparatus 11-2 is received by each of the receiving apparatus 12-21 to 12-36.

Similarly, radio communication in the millimeter waveband is performed among a third group of apparatus, i.e., between the transmitting apparatus 11-3 and the receiving apparatus 12-41 to 12-56 using the same channel or different channels. Thus, data transmitted from the transmitting apparatus 11-3 is received by each of the receiving apparatus 12-41 to 12-56.

Radio communication may be performed using the same channel by all of the first, second, and third groups of apparatus. Alternatively, the groups of apparatus may use different channels for radio communication.

When radio communication is performed on a one-to-many basis using the same channel, the frequency can be spatially separated between the groups of apparatus to prevent interference because certain intervals are kept between the groups. When radio communication is performed using different channels, radio communication within each group of apparatus is performed using a channel different from the channels used by the other groups. Therefore, frequency separation can be achieved to prevent interference. As s result, radio communication can be performed with high reliability.

The receiving apparatus 12 are provided in one-to-one association with the data processing apparatus 13. Therefore, it is not necessary to provide a signal distribution device unlike the case where data from one transmitting apparatus 11 is received by one receiving apparatus 12 and distributed by a signal distribution device (not shown) to N data processing apparatus 13. This is advantageous in that no complicated wiring is required.

A description has been made above on the case in which the transmitting apparatus 11 and the receiving apparatus 12 are disposed in a one-to-many relationship. Alternatively, the transmitting apparatus 11 and the receiving apparatus 12 may be disposed in a many-to-one relationship.

The present disclosure is not limited to such a configuration of the movable structure 141 in FIG. 16 wherein the rotary body 152 is rotated, and an alternative configuration for allowing either or both of the fixed member 151 and the rotary body 152 to be rotated may be employed.

Third Embodiment

Configuration 6 of Movable Structure

Figure 17:
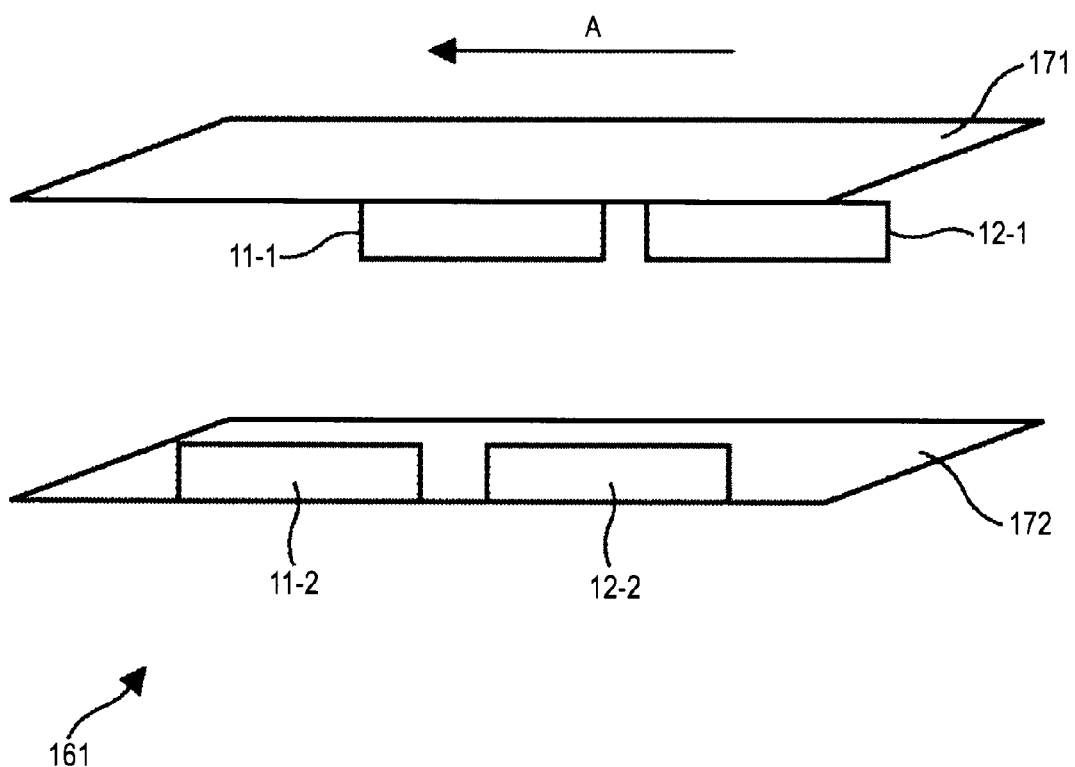
FIG. 17 is an illustration showing an exemplary configuration of a sliding movable structure.

A description has been made above on the case in which the transmitting apparatus 11 and the receiving apparatus 12 are disposed on a movable structure formed as a rotary body or a movable structure having a rotary body. However, the present disclosure is not limited to such movable structures associated with a rotary body, and the transmitting apparatus 11 and the receiving apparatus 12 may be disposed on a different type of movable structure. FIG. 17 shows an exemplary case in which the transmitting apparatus 11 and the receiving apparatus 12 are disposed on a movable structure formed as a sliding body.

A movable structure 161 is formed by a sliding member 171 and a fixed member 172, and the sliding member 171 and the fixed member 172 are disposed to face each other. The sliding member 171 of the movable structure 161 is driven by a motor (not shown) in the direction indicated by an arrow A in FIG. 17 or direction opposite to the direction of the arrow, and the fixed member 172 is fixed.

The transmitting apparatus 11-1 and the receiving apparatus 12-1 are disposed on a bottom surface of the sliding member 171. The transmitting apparatus 11-2 and the receiving apparatus 12-2 are disposed on a top surface of the fixed member 172.

For example, when the sliding member 171 is driven in the direction indicated by the arrow A in FIG. 17, the transmitting apparatus 11-1 is moved to a position where it faces the transmitting apparatus 11-2, and the receiving apparatus 12-1 is moved to a position where it faces the receiving apparatus 12-2. At this time, since the transmitting apparatus 11-1 and 11-2 face each other, and the receiving apparatus 12-1 and 12-2 face each other, no radio communication in the millimeter waveband takes place between the apparatus facing each other.

When the sliding member 171 is further driven in the direction indicated by the arrow A in FIG. 17, the receiving apparatus 12-1 is moved to a position where it faces the transmitting apparatus 11-2. At this time, since the receiving apparatus 12-1 and the transmitting apparatus 11-2 face each other, radio communication in the millimeter waveband is performed between them, and the data transmitted from the transmitting apparatus 11-2 is received by the receiving apparatus 12-1.

Since certain intervals are kept between the transmitting apparatus 11 and the receiving apparatus 12 disposed on the sliding member 171 and the fixed member 172, even when radio communication is performed between one of the pairs of the apparatus facing each other using the same channel as used by the other pair of the apparatus, the frequency is spatially separated. When radio communication is performed between one of the pairs of the apparatus facing each other using a channel different from the channel used by the other pair of the apparatus, frequency separation is achieved even if radio communication is performed between the pairs of the apparatus. Thus, interference between the frequencies can be prevented to allow reliable radio communication.

The movable structure 161 shown in FIG. 17 has been described on the case in which the sliding member 171 is slid and the fixed member 172 is fixed. However, the present disclosure is not limited to the configuration, and either or both of the sliding member 171 and the fixed member 172 may be allowed to slide. Specifically, the sliding member 171 and the fixed member 172 may be provided such that they can be moved relative to each other, and radio communication may be enabled when the transmitting apparatus 11 and the receiving apparatus 12 face each other as a result of the relative movement of the sliding member 171 and the fixed member 172.

In the present specification, the term "system" is used to represent a complex unity formed of a plurality of apparatus.

The present disclosure is not limited to the above-described embodiments, and various modifications may be made to the embodiments without departing the spirit of the present disclosure.

The present disclosure contains subject matter related to that disclosed in Japanese Priority Patent Application JP 2011-080119 filed in the Japan Patent Office on Mar. 31, 2011, the entire contents of which are hereby incorporated by reference.

What is claimed is:

1. A radio communication system comprising:
a first member;
a second member;
a transmitting apparatus provided on the first member; and
a receiving apparatus provided on the second member, wherein
the first member and the second member are provided such that they can move relative to each other; and
radio communication is performed when the transmitting apparatus and the receiving apparatus face each other as the first member and the second member move relative to each other.

2. The radio communication system according to claim 1, wherein
the first member and the second member are provided on the same axis of rotation; and
either or both of the first member and the second member are rotated about the axis of rotation.

3. The radio communication system according to claim 2, wherein
the first member and the second member are formed integrally with each other; and
the transmitting apparatus and the receiving apparatus are provided on the first member and the second member respectively such that they can be normally made to face each other.

4. The radio communication system according to claim 2, wherein
the first member and the second member are formed separately from each other; and
the transmitting apparatus and the receiving apparatus are provided on the first member and the second member respectively such that they can be made to face each other as a result of rotation of the member(s).

5. The radio communication system according to claim 1, wherein either or both of the first member and the second member are slid.

6. The radio communication system according to claim 1, wherein radio communication is performed by a pair of the transmitting and the receiving apparatus facing each other using the same channel as used by another pair of the transmitting and the receiving apparatus.

7. The radio communication system according to claim 1, wherein radio communication is performed by a pair of the transmitting and the receiving apparatus facing each other using a channel different from a channel used by another pair of the transmitting and the receiving apparatus.

8. The radio communication system according to claim 1, further comprising a control apparatus controlling radio communication between the transmitting apparatus and the receiving apparatus.

9. The radio communication system according to claim 8, wherein the control apparatus enables radio communication between a particular transmitting apparatus and a particular receiving apparatus based on terminal information for identifying the transmitting apparatus and the receiving apparatus.

10. The radio communication system according to claim 8, wherein the control apparatus enables radio communication between a particular transmitting apparatus and a particular receiving apparatus based on position information indicating the positions to which the first member and the second member have been moved.

11. The radio communication system according to claim 1, wherein the transmitting apparatus and the receiving apparatus are disposed on the first member and the second member in a one-to-many relationship.

12. The radio communication system according to claim 1, wherein radio communication utilizes the millimeter waveband.

* * * * *